United States Patent [19]

Pugh et al.

[11] Patent Number: 5,642,256
[45] Date of Patent: Jun. 24, 1997

[54] INTERLOCK MECHANISM FOR A MOTOR CONTROL UNIT

[75] Inventors: Richard D. Pugh, Seneca, S.C.; Conrad S. Weiden, Chapel Hill, N.C.

[73] Assignee: Square D Company, Palatine, Ill.

[21] Appl. No.: 286,728

[22] Filed: Aug. 5, 1994

[51] Int. Cl.[6] .................................................. H02B 5/00
[52] U.S. Cl. ........................................ 361/615; 200/50.02
[58] Field of Search .............................. 200/50 R, 50 AA, 200/50 A; 361/607, 609, 615–617

[56] References Cited

U.S. PATENT DOCUMENTS

| | | | |
|---|---|---|---|
| 4,760,220 | 7/1988 | Fritsch et al. | 200/50 A |
| 4,768,967 | 9/1988 | Fritsch | 439/152 |
| 5,019,676 | 5/1991 | Heckenkamp | 200/50 A |

FOREIGN PATENT DOCUMENTS

| | | | |
|---|---|---|---|
| 2-290110 | 11/1990 | Japan | 361/607 |
| 2-307305 | 12/1990 | Japan | 361/607 |

*Primary Examiner*—Gregory D. Thompson
*Attorney, Agent, or Firm*—Larry I. Golden; Kareem M. Irfan; Wayne H. Stoppelmoor

[57] ABSTRACT

An interlock mechanism in a motor control unit is provided for preventing the motor control unit from being engaged with current carrying bus bars within an enclosure when a handle disposed on the motor control unit is in an ON position, the handle controls a switching device disposed in the motor control unit, the interlock mechanism interacts with the switching device and automatically engages when the control unit is connected to the current carrying bus bars whereby preventing the motor control unit from being disengaged from the current carrying bus bars once the control unit becomes engaged with the current carrying bus bars and the handle is moved to the ON position.

13 Claims, 8 Drawing Sheets

INTERLOCK MECHANISM FOR A MOTOR CONTROL UNIT

FIELD OF THE INVENTION

This invention relates generally to motor control units for electrical equipment control centers and, more specifically, to interlock mechanisms for use with such motor control units.

BACKGROUND OF THE INVENTION

Control units which are used to control the distribution of electric current to a plurality of electric loads, such as a number of motors, from a central location, are generally housed in compartmented structures called control centers. Such control centers are formed of a group of individual control center sections each of which includes a plurality of cells or compartments wherein the control units are installed. Each control center section houses a number of control units vertically stacked one on top of the other. To facilitate wiring and servicing, control centers are provided with main horizontal bus bars which extend across the upper portions of all of the individual control center sections and which are connected to deliver current from a supply to groups of individual vertical bus bars in each control center section. Electrical current is supplied to the control center via the horizontal bus bars and is distributed through the vertical bus bars that run the length of each control center section. The vertical bus bars in turn deliver the current to the control units within the individual control center sections through separable jaw-like connectors which make contact with the vertical bus bars.

If a control unit were to be installed onto current carrying vertical bus bars while it was in the ON position, damage could be caused to the electrical distribution system, the control unit or the equipment which the control unit is controlling. Therefore, control units utilize an interlock mechanism to prevent them from being installed onto vertical bus bars when the control unit handle is in the ON position. Interlock mechanisms in the prior art require the user to manually engage the interlock mechanism when the control unit is fully engaged with the vertical bus bars. Therefore, there is a need to provide an interlock mechanism which automatically engages when the control unit is fully inserted into the control unit compartment.

SUMMARY OF THE INVENTION

It is a general object of the present invention to provide an interlock mechanism which prevents a motor control unit from being disengaged from vertical bus bars in an enclosure when the motor control unit is turned ON.

It is a more specific object of the present invention to provide an interlock mechanism in a motor control center that automatically engages when the motor control unit is fully connected to bus bars in an enclosure.

In accordance with a preferred embodiment of the present invention an interlock mechanism in a motor control unit is provided for preventing the motor control unit from being engaged with current carrying bus bars within an enclosure when a handle disposed on the motor control unit is in an ON position, the handle controls a switching device disposed in the motor control unit, the interlock mechanism interacts with the switching device and automatically engages when the control unit is connected to the current carrying bus bars whereby preventing the motor control unit from being disengaged from the current carrying bus bars once the control unit becomes engaged with the current carrying bus bars and the handle is moved to the ON position, the interlock mechanism includes a bracket having a base portion secured to the enclosure and a leg portion having a first tab extending therefrom, the leg portion having a slot therein for interacting with the switching device. A movable slide member is movably secured to the bracket having a second tab extending therefrom, the movable slide member having an laterally extending tab for engaging the interlock mechanism and thereby preventing the control unit from being removed from the current carrying bus bars when the handle is in the ON position. A spring is disposed between the first tab and second tab for automatically engaging the interlock mechanism when the control unit is engaged with the bus bars.

In accordance with another aspect of the present invention a control linkage in a motor control unit is provided for actuating a circuit breaker disposed in the motor control unit in response to a handle disposed on the motor control unit, the control linkage includes a bracket member secured to a base portion in the motor control unit. A first link is coupled to the handle and a second link is rotatably coupled to the bracket member. The second link has an upwardly extending arm portion and an adjustable arm is disposed on the upwardly extending arm portion for engagement with a movable handle extending from the circuit breaker.

In accordance with yet another aspect of the present invention a motor control unit which is adapted to be engaged with bus bars within an enclosure section is provided including an enclosure having a base portion and a plurality of sidewall portions and a connector stab assembly disposed on one of the plurality of sidewall portions. A circuit breaker is disposed in the enclosure and electrically coupled to the connector stab assembly, the circuit breaker having a movable handle extending therefrom. A fuse block assembly is disposed in the enclosure and electrically coupled to the circuit breaker. A transformer is disposed in the enclosure and electrically coupled to the fuse block assembly and a motor starter assembly is disposed in the enclosure and electrically coupled to the transformer. A handle assembly having a handle disposed on one of the plurality of sidewall portions and being movable between an ON position and an OFF position. A circuit breaker linkage assembly is disposed in the enclosure for coupling the handle assembly to the circuit breaker for controlling the circuit breaker with the handle assembly, the circuit breaker linkage assembly having a first link coupled to the handle assembly. An interlock mechanism is disposed in the enclosure for preventing the control unit from being disengaged from the bus bars when the handle is in the ON position, the interlock mechanism interacts with the circuit breaker linkage assembly and automatically engages when the control unit is connected to the bus bars.

BRIEF DESCRIPTION OF THE DRAWINGS

Other objects and advantages of the invention will be apparent from the following detailed description and the accompanying drawings in which.

DETAILED DESCRIPTION OF THE PREFERRED EMBODIMENTS

For a better understanding of the present invention together with other and further advantages, and capabilities thereof, reference is made to the following disclosure and appended claims in connection with the above-described drawings.

Figure 1:
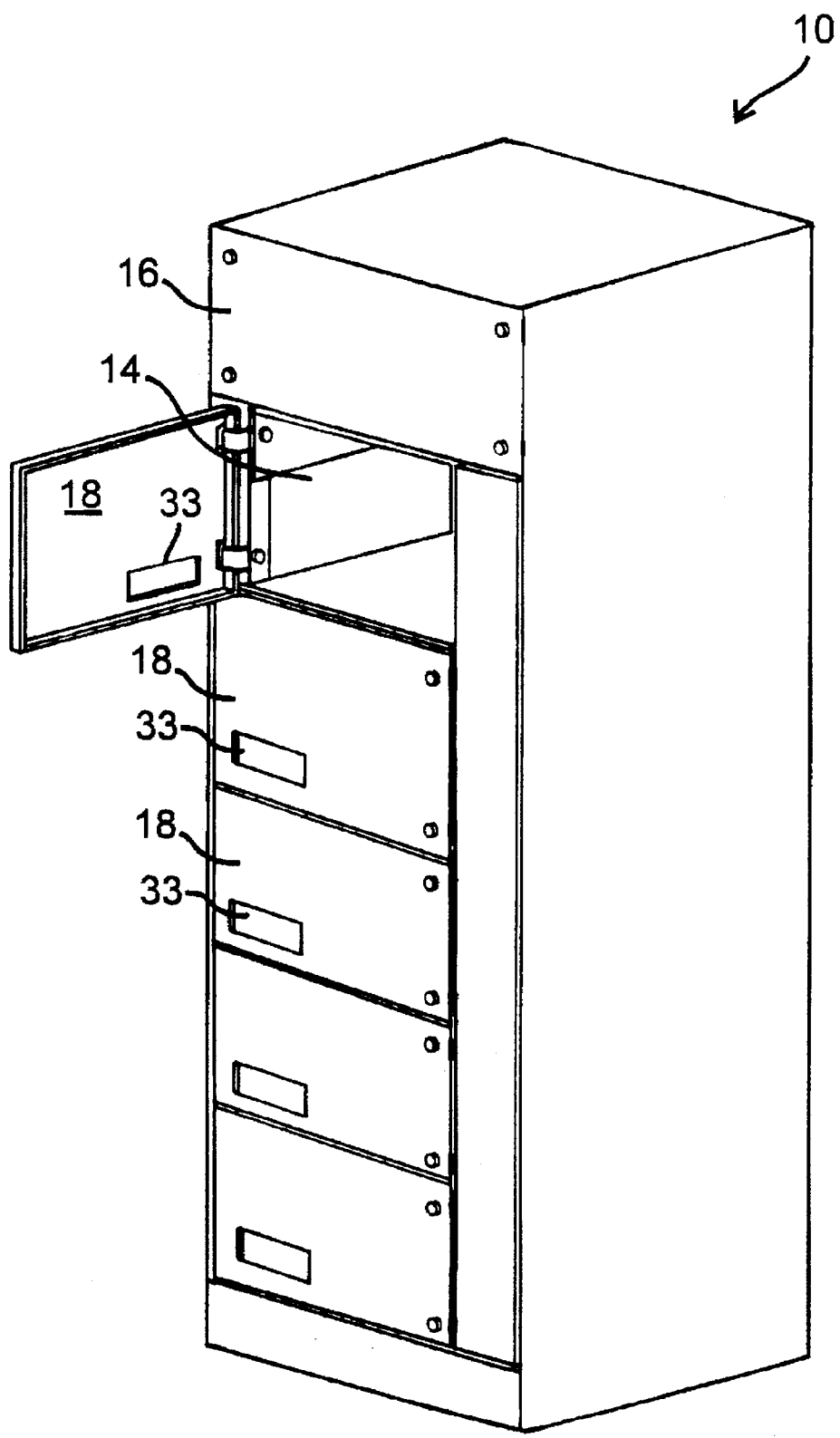
FIG. 1 is a representation isometric view of a control center section.

By way of background information, referring initially to FIG. 1 of the drawings, there is illustrated a motor control center section 10 which may, for example, be of the type described in U.S. Pat. No. 3,482,143, issued Dec. 11, 1967, entitled "Unit Mounting Pan for an Electrical Enclosure Structure" or U.S. Pat. No. 3,495,135, issued Dec. 11, 1967, entitled "Electrical Control Center Structure Having Symmetrical Parts"; both patents are assigned to Square D Company and the disclosures therein are incorporated herein by reference.

Each motor control section 10 contains individual control units 12 (FIG. 2) positioned inside a control unit compartment 14 which are stacked one on top of the other. Each motor control unit 12 is hung from a unit shelf (not shown) which is mounted in each compartment 14. The unit shelf may, for example, be of the type described in U.S. Pat. No. 4,787,011, issued Nov. 22, 1988, entitled "Control Center Unit Shelf Assembly", assigned to Square D Company and the disclosure therein is incorporated herein by reference. Several motor control sections 10 are generally placed side by side in an industrial location to control the electrical equipment of a plant. A horizontal bus bar compartment cover 16, at the top of the control center 10 section, covers the area which houses horizontal bus bars (not shown) and their connection to vertical bus bars (not shown). A supply source provides electrical power through the horizontal bus bars and vertical bus bars to the individual control units 12. The control units 12 are enclosed in the control compartments 14 with a door 18.

Figure 2:
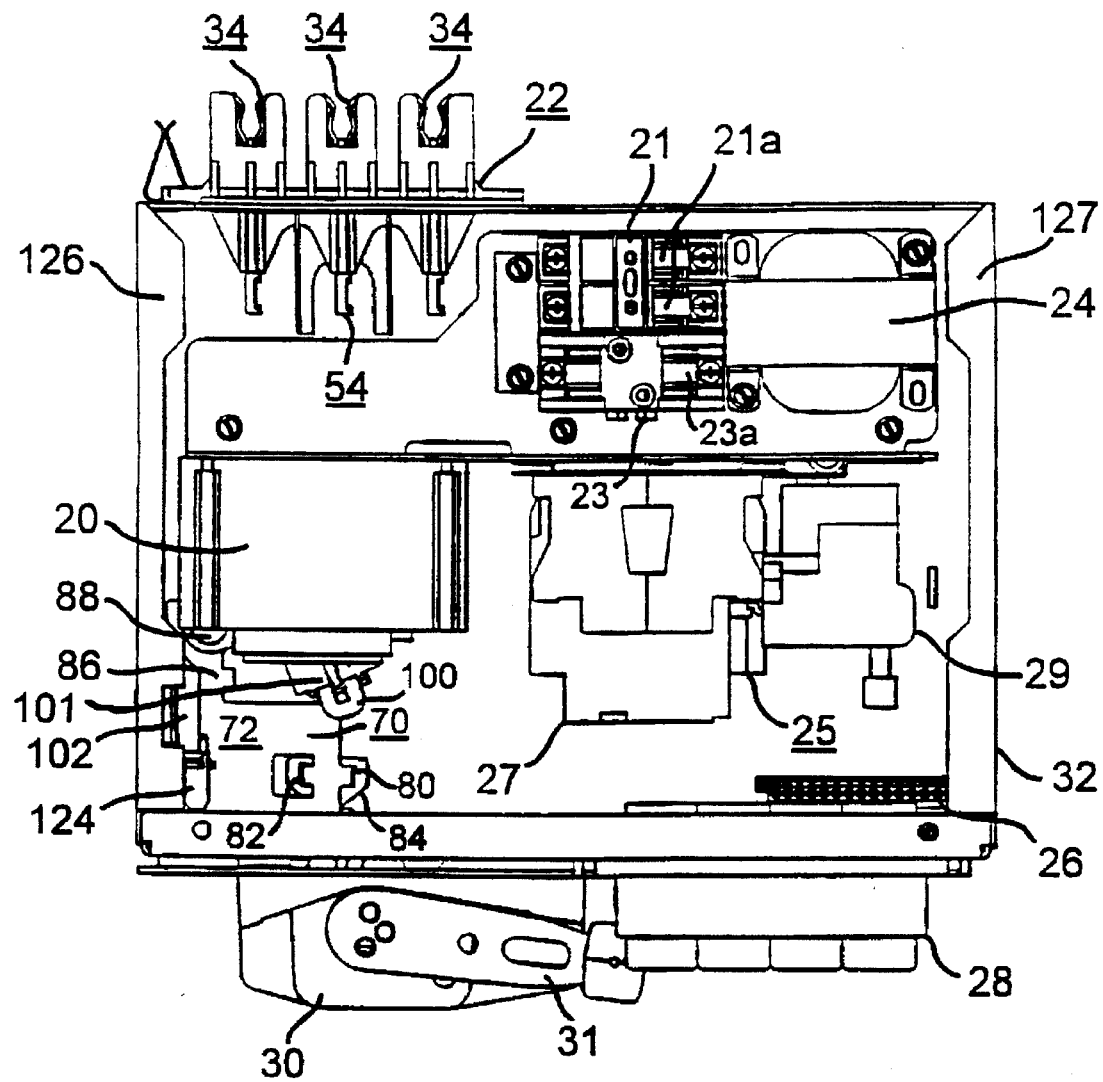
FIG. 2 is a top view of a motor control unit.

Now referring to FIG. 2, the control unit 12 is shown containing a circuit breaker 20, a connector stab assembly 22, a two pole primary fuse block 21, a single pole secondary fuse block 23, a transformer 24, a motor starter assembly 25, a terminal block assembly 26, a control panel assembly 28, and a handle assembly 30 having an operating handle 31. The above-mentioned components are housed in or secured to an enclosure 32 which has a base portion 89 (FIG. 6) and four sidewall portions. The handle assembly 30 extends outwardly through an opening 33 (FIG. 1) in the door 18.

The two pole fuse block 21 and single pole fuse block 23 are available as cat. no. BC6032P and cat. no. BC6031P, respectively, from Cooper Industries Inc., Bussmann Division of St. Louis, Mo. The fuse blocks contain traditional fuses 21a, 23a which are sized appropriately for their specific application. The transformer 24 is a traditional control power transformer such as Class 9070, type EL available from Square D Company of Palatine, Ill. The motor starter assembly 25 is comprised of a contactor 27 and an overload relay 29 and may be obtained separately or as a complete assembly such as catalog no. 85365CO3Z025 from Square D Company of Palatine, Ill. The circuit breaker 20 can be any traditional 3 phase circuit breaker such as cat. no. GJL36030M04 from Square D Company of Palatine, Ill.

The terminal block assembly 26 is comprised of a plug and base portion which are available as cat. nos. MSTB2.5/15-ST-5.08 and MBSTBU2.5/15-GB-5.08, respectively, from Phoenix Contact of Harrisburg, Pa. Control wires for controlling the control unit 12 are coupled to the terminal block 26. The control panel assembly 28 is comprised of 22 millimeter pilot lights which are available as cat. no. XB2B from Square D Company of Palatine, Ill.

Power is distributed to the motor control unit 12 from the vertical bus bars through a plurality of jaw assemblies 34, disposed in the connector stab assembly 22, which make electrical contact with the vertical bus bars. The jaw assemblies 34 are adapted to be connected to the vertical bus bars within the control section 10.

Figure 3:
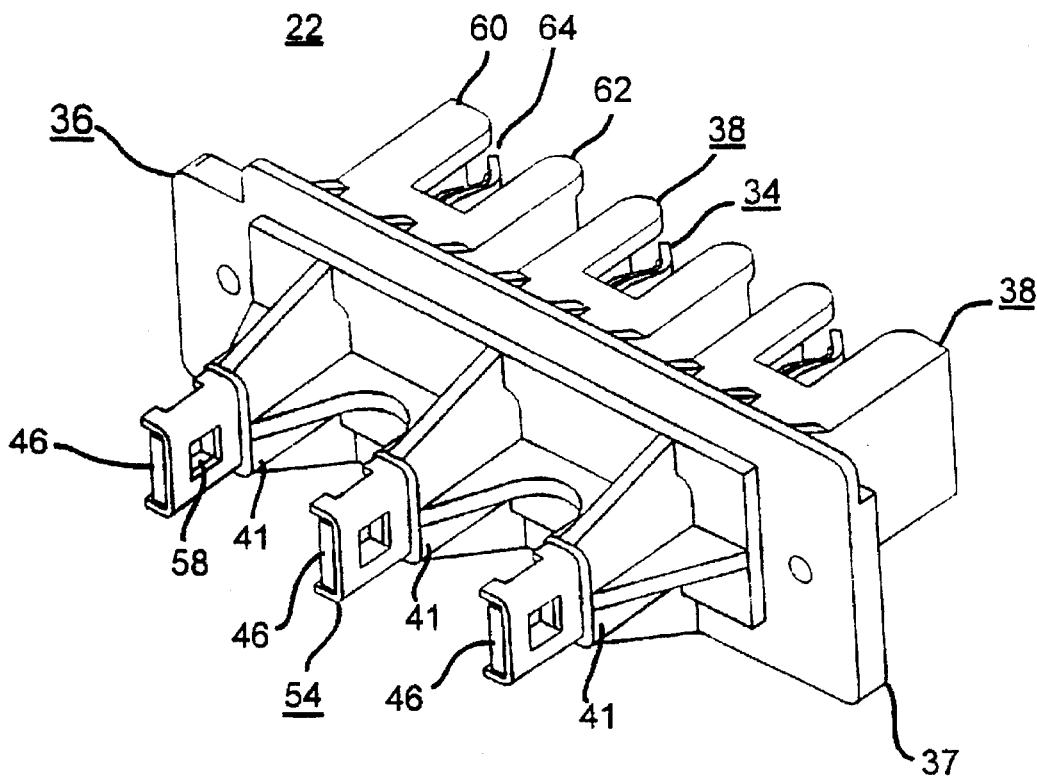
FIG. 3 is an isometric view of the connector stab assembly shown in FIG. 2.
Figure 4:
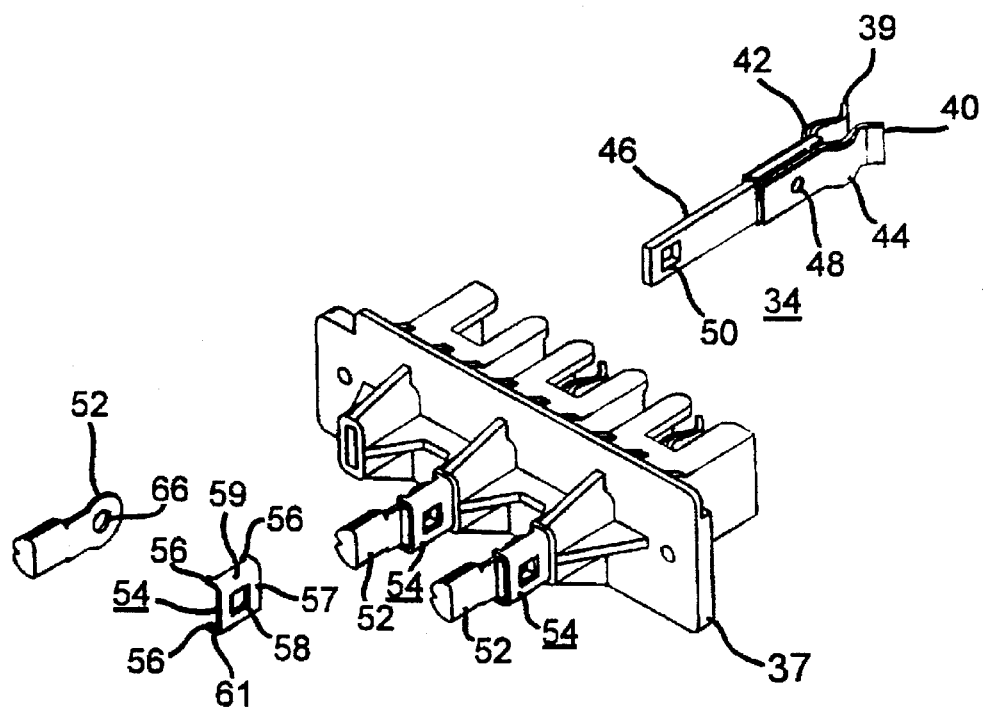
FIG. 4 is an isometric view of the connector stab assembly shown in FIG. 2 with a jaw assembly removed from the housing.
Figure 5:
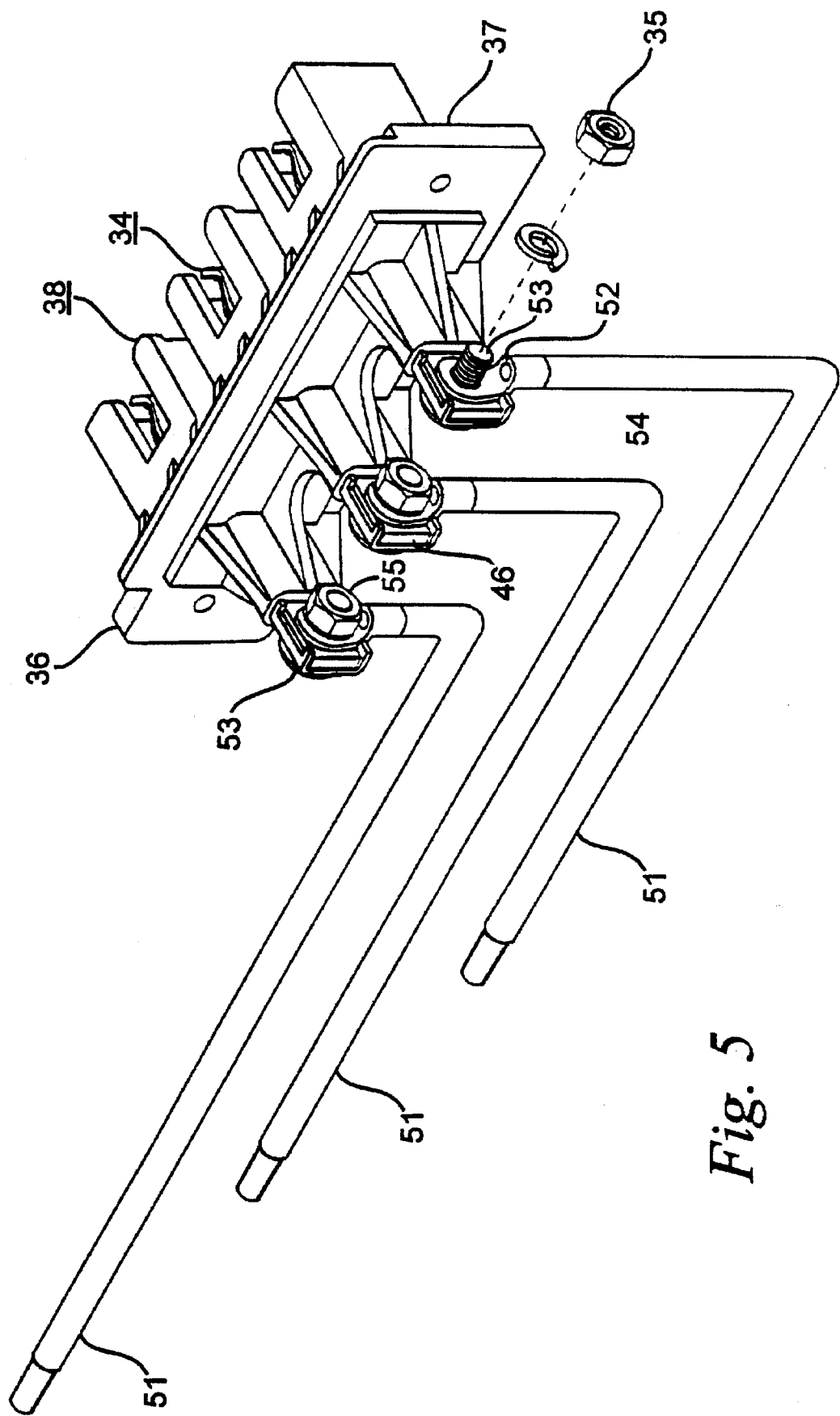
FIG. 5 is an isometric view of the connector stab assembly shown in FIG. 2 with wire conductors secured to metal bars of the jaw assemblies utilizing antirotation members.

The connector assembly 22 is disposed in an opening 43 (FIG. 6) in a sidewall 45 which is secured to the enclosure 32. FIGS. 3–5 show the connector stab assembly 22 having a one piece molded plastic housing 36 with the jaw assemblies 34 extending through the housing 36 and an antirotation clip 54. The housing 36 has a plurality of jaw connector covers 38 extending from one side of a base portion 37 and a plurality of bar covers 41 extending from the opposite side of the base portion 37 with each bar cover 41 corresponding to one of the jaw connector covers 38. Each jaw connector cover 38 include a pair of opposing u-shaped sidewalls 60, 62 which partially enclose one of the connecting jaw assemblies 34 which protrudes through an opening in the base portion 37 of the housing 36. An opening 64 is provided between the opposing sidewalls 60, 62 for positioning the vertical bus bars therebetween thereby allowing the jaw assemblies to slide onto the vertical bus bars.

Each of the jaw assemblies 34 include a metal bar 46 extending through the housing 36 and having first and second jaw fingers 39, 40 secured thereto and extending from one end thereof for making electrical contact with the vertical bars (not shown). Corresponding first and second spring members 42, 44 are disposed on their corresponding jaw fingers 39, 40, respectively, for biasing the jaw fingers towards each other and onto the vertical bus bar thereby assuring a good electrical connection. The jaw fingers and spring members are secured to one end of the metal bar 46 utilizing a bolt (not shown) which passes through an aperture 48 and secured in place with a nut (not shown). The jaw fingers and spring members may be secured to the metal bar 46 with a rivet, by welding, or any other method that will provide a secure electrical connection. The other end of the metal bar 46 protrudes through its respective bar cover 41 on the other side of the base 37 and contains a square aperture 50 for receiving a traditional square neck bolt 53 having a square neck which passes into the square aperture 50.

A wire conductor 51 (FIG. 5) having a ring terminal 52 secured thereto is electrically coupled to the metal bar 46 with the square neck bolt 53 and a nut 55. The anti-rotation clip 54 is positioned between the head of the square neck bolt 53 and the metal bar 46 for preventing the wire conductor 51 from rotating. The anti-rotation clip 54 is generally table-shaped having a planar base portion 57 (FIG. 4) and four legs 56 (the fourth leg is not shown) extending outwardly from the corners of two opposing side members 59, 61 which extend outwardly from the base portion 57. The legs 56 extend over the metal bar 46. The base portion 57 of the anti-rotation clip 54 has a square aperture 58 therein which aligns with the square aperture 50 in the metal bar 46 for allowing the square neck bolt 53 to pass through both square apertures. The ring terminal 52 is nested within the legs 56 while the round portion of the square neck bolt 53 extends through an aperture 66 in the ring terminal 52 and the square neck portion engages the aligned square apertures 50, 58. The nut 55 is then secured to the bolt 53 thereby securing the ring terminal 52 to the metal bar 46. This engagement with the ring terminal 52 nested within the legs 56 of the anti-rotation clip 54 establishes a limited angular displacement thereby preventing the wire terminal and wire conductor from rotating. By positioning the anti-rotation clip 54 so that the legs 56 overlap both the metal bar 46 and the ring terminal 52 thereby utilizing the legs 56 for preventing the ring terminal and the anti-rotation clip 54 from rotating about the bolt 53, the anti-rotation clip 54 will function effectively with a round aperture or any other shaped aperture instead of the square aperture 50 provided the aperture allows the bolt to pass therethrough.

Again referring to FIG. 2, electrical current is supplied to the control unit 12 via the horizontal bus bars (not shown) and is distributed through the vertical bus bars (not shown). The vertical bus bars in turn deliver the current to the control unit 12 through the separable jaw assemblies 34 which make contact with the vertical bus bars. When the operating handle 31 is in the ON position which turns ON the circuit breaker 20, the current then flows through the circuit breaker 20 and to the other components of the control unit 12 through a power circuit and a control circuit. For example, current in the power circuit is directed to the motor starter 25 and then to motors (not shown) which are being control by the control unit 12. In the control circuit the current flows from the circuit breaker 20 to the primary fuse assembly 21, through the fuses 21a and through the transformer 24 to the secondary fuse assembly 23 and then through the secondary fuse 23a to the terminal block assembly 26 where current is selectively routed to the contactor 27, the control panel assembly 28 and other control components, such as a push-to-start button (not shown).

Figure 6:
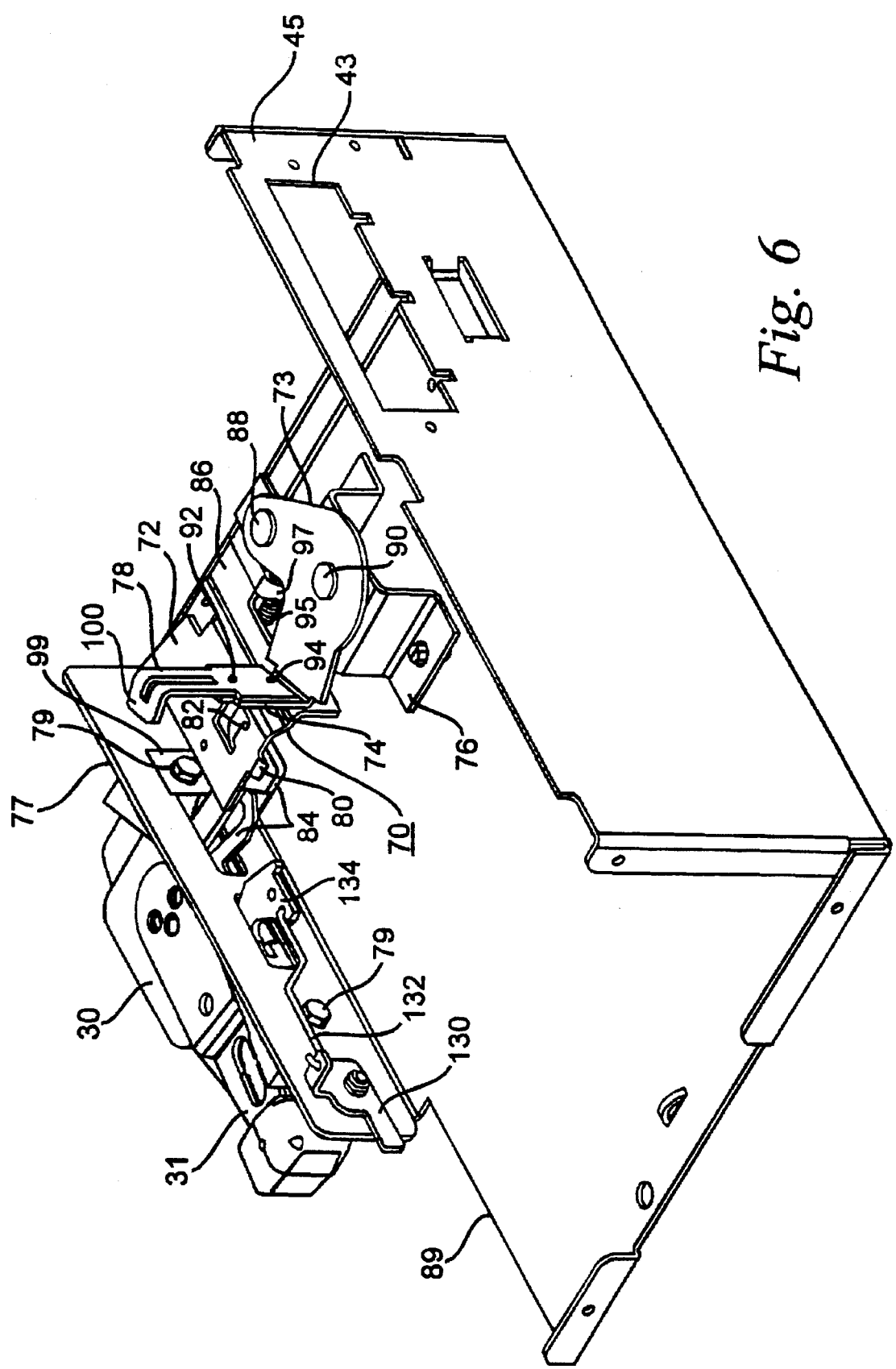
FIG. 6 is an isometric view of the control unit showing only the handle assembly and the circuit breaker linkage assembly.
Figure 7:
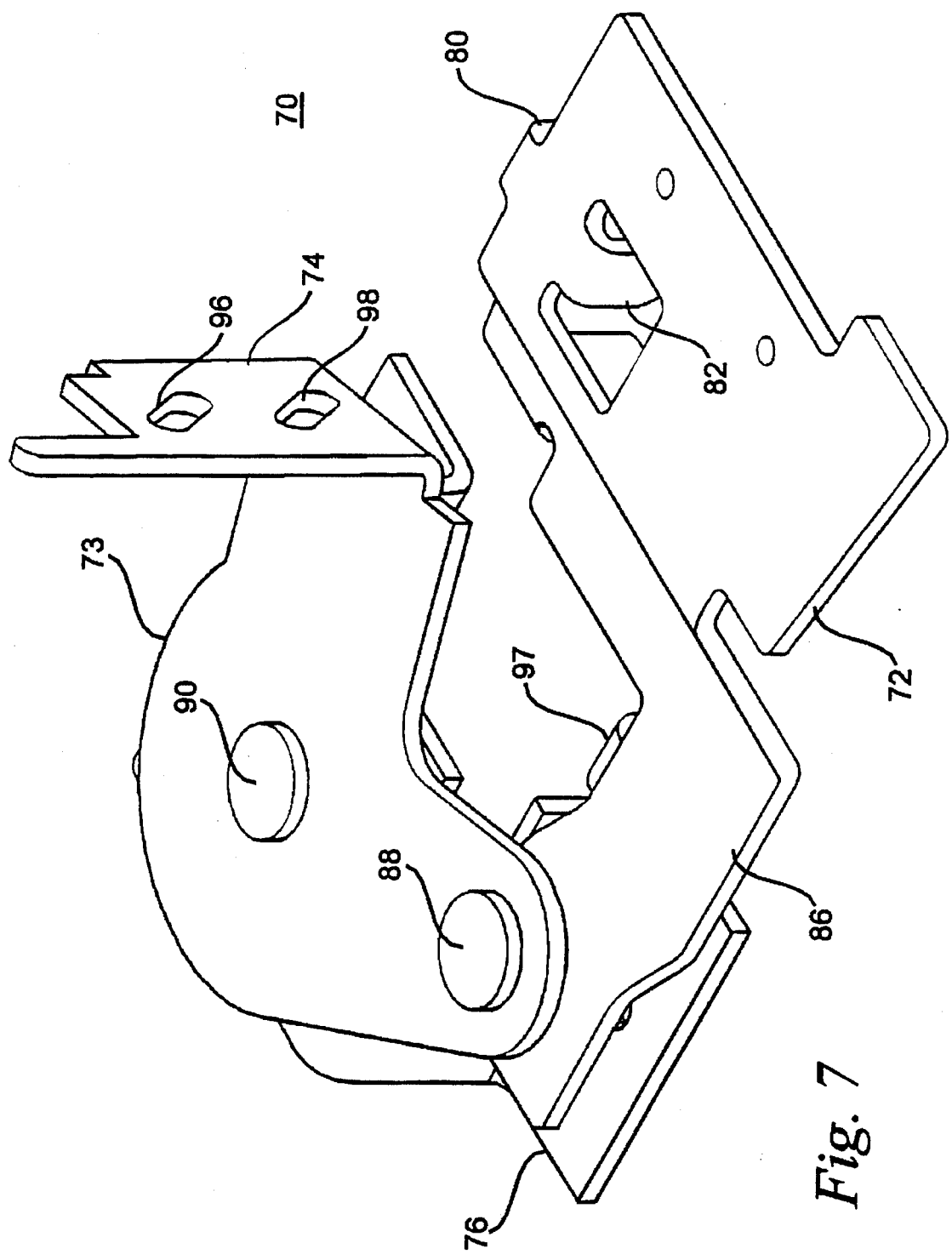
FIG. 7 is an isometric view of the circuit breaker linkage assembly without the adjustment plate secured thereto.

Referring to FIGS. 2, 6 and 7 the circuit breaker linkage assembly 70 is shown which translates rotary motion of the operating handle 31 into rotary motion which actuates the circuit breaker 20. For example, when the operating handle 31 is moved to the ON position the circuit breaker is moved to the ON position thereby allowing current to pass through the circuit breaker. The linkage assembly 70 consists of a first link 72, a second link 73 having an upwardly extending bail arm 74, a u-shaped mechanism bracket 76 and a L-shaped adjustment plate 78. The handle assembly 30 is secured to one of the enclosure sidewalls 77 with a pair of bolts 79.

The first link 72 has a pair of downwardly extending tabs 80, 82 which are disposed in corresponding slots in a handle link 84. The handle link 84 is secured to the operating handle 31 thereby transferring the rotary motion of the operating handle 31 to linear motion of the first link 72. The first link 72 has a neck portion 86 which is secured to the second link 73 with a rivet 88. A rivet 90 rotatably secures the second link 73 to the mechanism bracket 76 which is secured to the base 89 of the enclosure. The adjustment plate 78 is secured to the bail arm 74 with screws 92, 94 which pass through a pair of diagonally positioned slots 96, 98 in the bail arm 74 and into tapped holes in the adjustment plate 78. The adjustment plate 78 has an outwardly extending finger portion 100 which engages a circuit breaker handle 101 to actuate the handle thereby turning the circuit breaker ON and OFF. The diagonal slots 96, 98 provide an adjustable interface between the circuit breaker handle and the adjustment plate 78. The second link 73 being supported by the mechanism bracket 76 converts linear motion of the first link 72 into a rotary motion which is utilized by the bail arm 74 and the adjustment plate 78 to actuate the circuit breaker 20.

An extension spring 95 is utilized to move the operating handle 31 into a position between the ON and OFF positions to indicate that the circuit breaker 20 has tripped. The extension spring 95 is secured at one end to a downwardly positioned ear tab 97 on the neck portion 86 and the other end of the spring 95 is secured to a hook (not shown) disposed on a bracket 99 which is secured to the sidewall portion 77 with the bolt 79.

Figure 8:
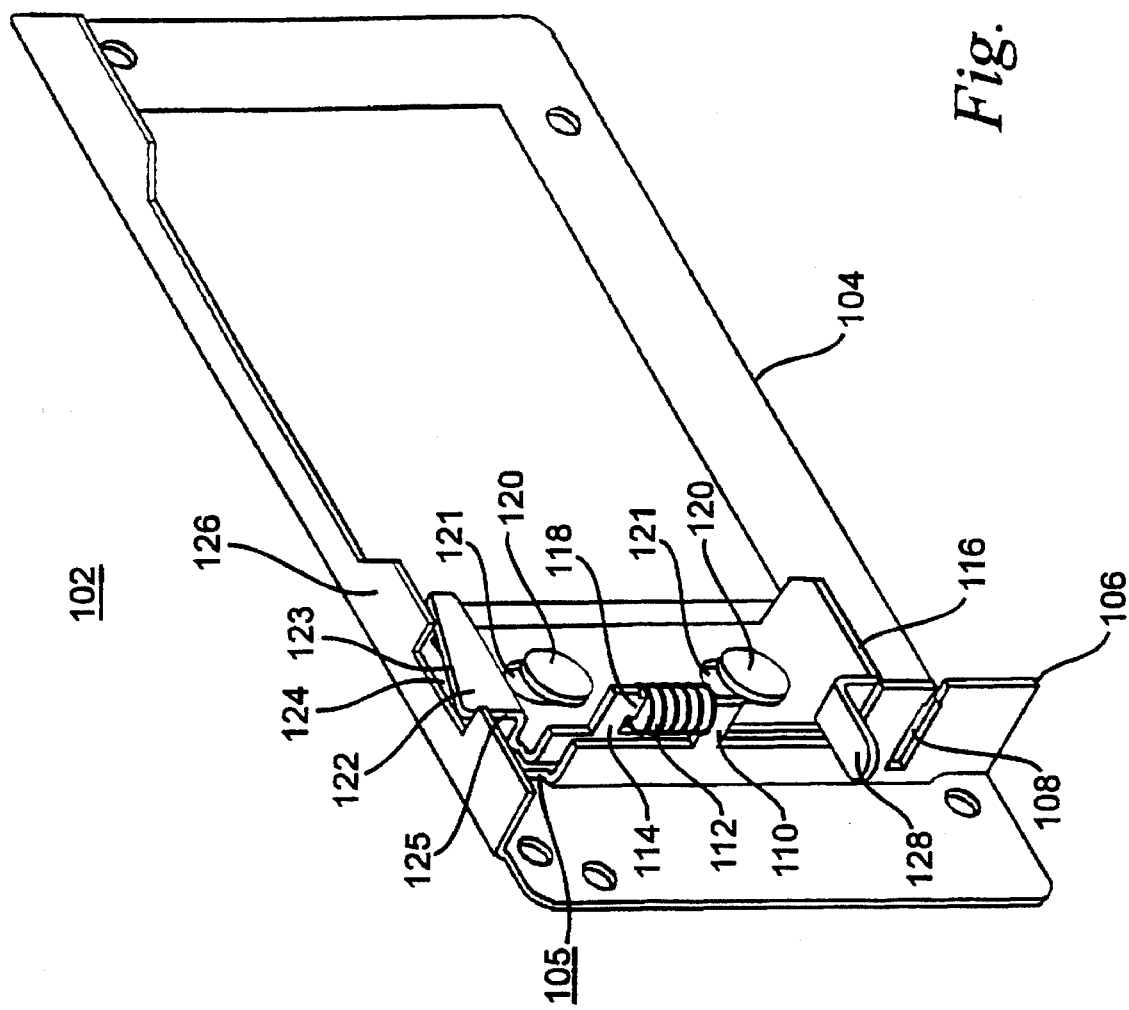
FIG. 8 is an isometric view of the interlock assembly.
Figure 9:
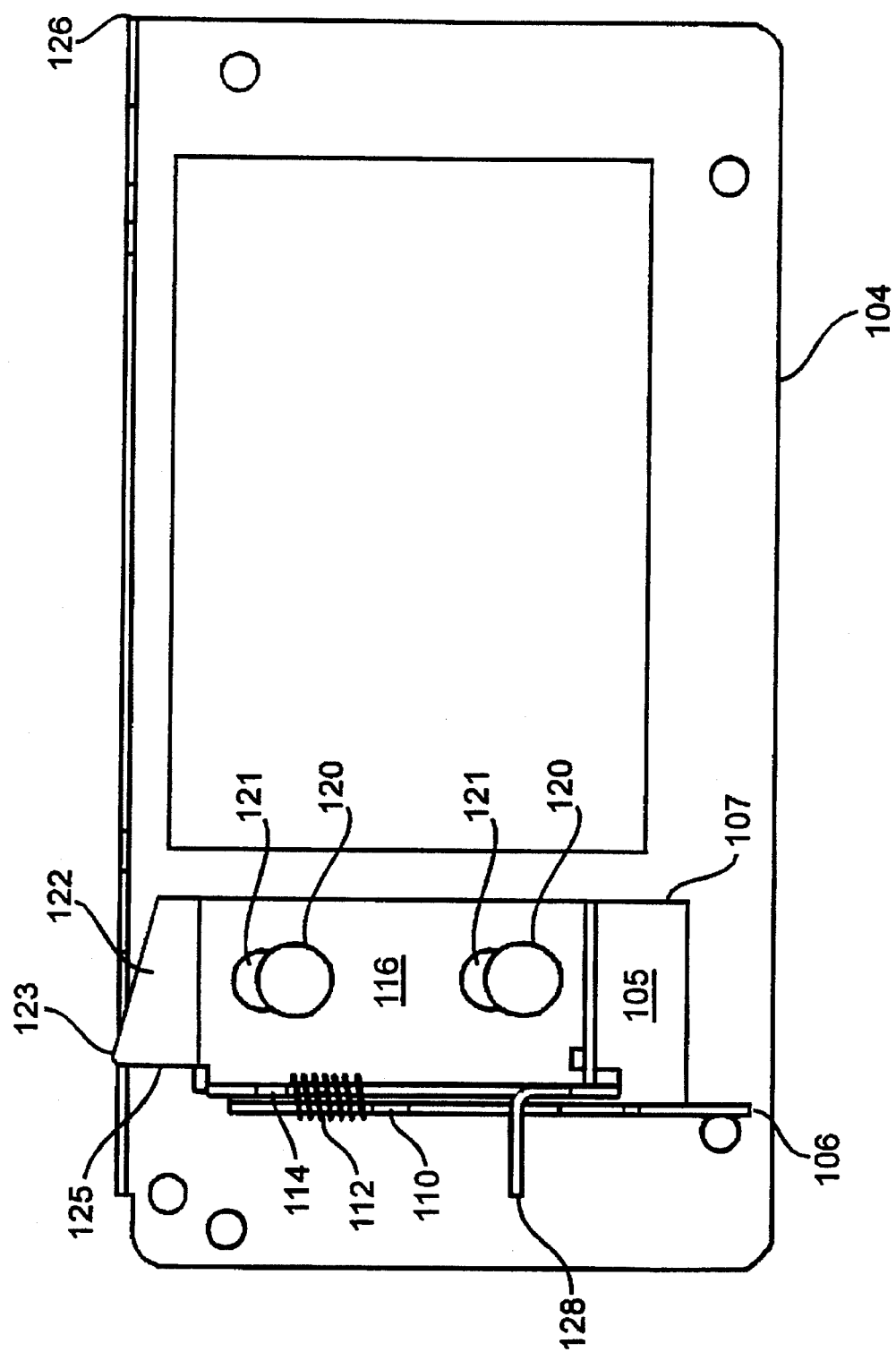
FIG. 9 is a side view of the interlock assembly shown in FIG. 8.

Referring now to FIGS. 2, 8 and 9, an interlock assembly 102 is shown which prevents the insertion of the control unit 12 into the unit compartment 14 (FIG. 1) when the operating handle 31 is in the ON position. Additionally, the interlock assembly 102 prevents the control unit 12 from being removed from electrical contact with the vertical bus bars when the operating handle 31 is in the ON position.

The interlock assembly 102 includes a L-shaped bracket 105 having an outwardly extending leg 106 and a base portion 107 (FIG. 9) secured to a sidewall portion 104 which is secured to the base 89 (FIG. 6) of the enclosure. The leg 106 has a slot 108 (FIG. 8) therein for receiving the first link 72 of the circuit breaker linkage assembly 70. A first spring retaining extension 110 is formed on the leg 106 for retaining one end of a compression spring 112. The other end of the spring 112 is retained by a second spring retaining extension 114 disposed on a movable slide member 116. The two spring retaining extensions 110, 114 have a spring retaining tab 118 for retaining the compression spring 112 therebetween.

The bracket 105 and the movable slide member 116 are secured to the sidewall portion 104 with a pair of rivets 120. The slide member 116 has a pair of slotted apertures 121 therein so that the movable slide member 116 may move in a vertical direction. The slots 121 are sized large enough so that the pins (not shown) of the rivets 120 pass therethrough and small enough so that the heads of the rivets do not pass through the slots 121. The spring 112 biases the slide member 116 upwardly so that the slide member 116 is normally in the up position. The slide member 116 includes a ramp-shaped tab 122 disposed thereon extending upwardly through a notch 124 in a flange 126 formed on the sidewall portion 104. The ramp-shaped tab has an angled ramp edge 123 and a vertical tab edge 125. A finger tab 128 is formed on the slide member 116 and extends through an opening in the leg 106.

Referring to FIGS. 1, 2, 7 and 8, the operation of the interlock assembly will now be discussed. To insert the control unit 12 into the compartment 14 of the control section 10 the operating handle 31 must be in the OFF position. The flanges 126, 127 of the control unit 12 are slid onto traditional shelf flanges (not shown) on the unit shelf (not shown) in the compartment 14. The shelf flanges engage the ramp edge 123 of the ramp-shaped flange 122 thereby moving the slide member 116 downward. If the operating handle 31 is in the ON position the first link 72 of the circuit breaker linkage assembly 70 will extend through the slot 108 and therefore be in the path of the movable slide member 116 thereby not allowing the movable slide member 116 and the ramp-shaped tab 122 to move downward thereby not allowing the control unit 12 to move along the shelf flanges into the compartment. If the operating handle 31 is in the OFF position the first link 72 will not block the slide member 116 from moving downwardly thereby allowing the shelf flange to force the ramp-shaped tab 122 downwardly and out of the way. The control unit 12 is moved into the compartment 14 until the jaw assemblies are totally engaged with the vertical bus bars. When the control unit 12 is completely installed in the compartment 14 the ramp-shaped tab 122 aligns with a notch (not shown) in the shelf flange and allowing the slide member 116 to automatically return to its normal position, due to the bias spring 112 forcing the slide member 116 upwardly thereby automatically engaging the interlock mechanism 102. When the interlock mechanism 102 is engaged, the control unit 12 may not be removed from the compartment 14 because the ramp-shaped tab 122 is in a normally upward position into the notch in the shelf thereby positioning the tab edge 125 behind an edge of the notch and preventing the control unit 12 from being removed from the compartment 14. When the handle is in the ON position the interlock mechanism 102 can not be defeated because the first link 72 extends through the slot 108 and blocks the slide member 116 from moving downward thereby preventing the ramp-shaped tab 122 from moving downward and releasing its hold in the notch of the shelf flange. When the operating handle 31 is in the OFF position, the first link 72 is removed from the path of the slide member 116 thereby allowing a user to push down on the finger tab 128 and removing the ramp-shaped tab 122 from the notch in the shelf flange which allows the control unit 12 to be removed from the compartment 14.

As the control unit 12 is being inserted into the compartment 14 the interlock assembly 102 performs the additional task of not allowing the circuit breaker 20 to be turned ON until the control unit 12 is fully inserted into the compartment 14. If the control unit 12 is not fully engaged in the compartment 14 the ramp-shaped tab 122 of the slide member 116 will not align with the notch in the shelf flange and will not move upward thereby causing the slide member 116 to be in a downward position thereby blocking the movement of the first link 72 therefore preventing the circuit breaker linkage assembly 70 from turning ON the circuit breaker.

The present interlock assembly 102 is an improvement over the prior art because it engages automatically. Interlock assemblies in the prior art required them to be manually engaged by the user. The interlock assembly was described being integrated with a circuit breaker, however, this interlock assembly could be integrated with an electrical disconnect switch such as the one described in U.S. Pat. No. 4,302,643 entitled "Fusible Switch" which is assigned to the same assignee as the present application, and is hereby incorporated by reference.

FIG. 6 shows a traditional door interlock assembly comprising a flap tab 130, a link 132 and a rotatable handle assembly tab 134 which will not allow the cabinet compartment door 18 to be opened if the operating handle 31 is in the ON position. Additionally, the door interlock assembly will not allow the control unit 12 to be turned ON if the door 18 is open.

While there have been shown and described what are at present considered the preferred embodiments of the invention, it will be obvious to those skilled in the art that various changes and modifications may be made therein without departing from the scope of the invention as defined by the appended claims.

What is claimed is:

1. An interlock mechanism in a motor control unit for preventing the motor control unit from being engaged with current carrying bus bars within an enclosure when a handle disposed on the motor control unit is in an ON position, the handle having a link member coupled thereto controls a switching device disposed in the motor control unit, said interlock mechanism interacts with the switching device and automatically engages when said control unit is connected to the current carrying bus bars whereby preventing the motor control unit from being disengaged from the current carrying bus bars once the control unit becomes engaged with the current carrying bus bars and the handle is moved to the ON position, said interlock mechanism comprising:

a bracket secured to the motor control unit having a base portion and a leg portion extending outwardly from said base portion, said leg portion having a first spring retaining extension extending therefrom and a slot therein;

said slot cooperating with the link member, wherein said link member is disposed inside said slot when the handle is in the ON position and outside said slot when the handle is in an OFF position;

a slide member movably secured to said bracket having a second spring retaining extension extending therefrom, said slide member having an upwardly extending flange at a first end adapted for engaging the enclosure, said slide member having a second end for engaging the link member when the handle is in the ON position thereby preventing said slide member from disengaging the enclosure and preventing the control unit from being removed from the current carrying bus bars; and a spring disposed between said first extension and said second extension for biasing said slide member into engagement with the enclosure when the control unit is fully engaged with the bus bars.

2. A motor control unit according to claim 1, wherein said flange is generally ramp-shaped.

3. A motor control unit according to claim 1, wherein said bracket is generally L-shaped.

4. A motor control unit according to claim 1, wherein said movable slide member further has a finger tab extending therefrom for disengaging said interlock mechanism.

5. A control linkage in a motor control unit for actuating a circuit breaker disposed in the motor control unit in response to a handle disposed on the motor control unit, said control linkage comprising:

a bracket member adapted to be secured to a base portion in the motor control unit;

a first link adapted to be coupled to the handle;

a second link being rotatably coupled to said bracket member and said first link, said second link having an upwardly extending arm portion; and an adjustable arm disposed on said upwardly extending arm portion for engagement with a movable handle extending from the circuit breaker.

6. A motor control unit according to claim 5, wherein said upwardly extending arm portion has at least on diagonal slot wherein retaining members are inserted therethrough for securement to said adjustable arm.

7. A motor control unit according to claim 5, wherein said adjustable arm is generally L-shaped.

8. A motor control unit adapted to be engaged with bus bars within an enclosure section, said motor control unit comprising:

an enclosure having a base portion and a plurality of sidewall portions;

a connector stab assembly disposed on one of said plurality of sidewall portions;

a circuit breaker disposed in said enclosure and electrically coupled to said connector stab assembly, said circuit breaker having a movable handle extending therefrom;

a fuse block assembly disposed on said base plate and electrically coupled to said circuit breaker;

a transformer disposed in said enclosure and electrically coupled to said fuse block assembly;

a motor starter assembly disposed in said enclosure and electrically coupled to said transformer a handle assembly having a handle disposed on one of said plurality of sidewall portions, said handle being movable between an ON position and an OFF position, said handle assembly including a link coupled to said handle;

a circuit breaker linkage assembly disposed in said enclosure for coupling said handle assembly to said movable handle for controlling said circuit breaker with said handle assembly, said circuit breaker linkage assembly having a first link coupled to said handle assembly; and an interlock mechanism disposed in said enclosure for preventing said control unit from being engaged with the bus bars when said handle is in the ON position, said interlock mechanism interacts with said circuit breaker linkage assembly and automatically engages when said control unit is connected to the bus bars for preventing said control unit from being disengaged from the bus bars when said handle is in the ON position, said interlock mechanism comprising:

a bracket secured to the motor control unit having a base portion and a leg portion extending outwardly from said base portion, said leg portion having a first spring retaining extension extending therefrom and a slot therein;

said slot cooperates with said first link, wherein said link is disposed in said slot when said handle is in the ON position and said link is not disposed in said slot when said handle is the OFF position;

a movable slide member movably secured to said bracket having a second spring retaining extension extending therefrom, said slide member having an upwardly extending flange at a first end adapted for engaging the enclosure section, said slide member having a second end for engaging said link when the handle is in the ON position thereby preventing said slide member from disengaging the enclosure section and preventing the control unit from being removed from the current carrying bus bars;

a spring disposed between said first extension and said second extension for biasing said slide member into engagement with the enclosure section when the control unit is fully engaged with the bus bars.

9. A motor control unit according to claim 8, wherein the circuit breaker linkage assembly comprises:

a bracket member secured to said base portion of said enclosure;

a second link being rotatably coupled to said bracket member and said first link, said second link having an upwardly extending arm portion; and an adjustable arm disposed on said upwardly extending arm portion for engagement with the movable handle extending from said circuit breaker.

10. A motor control unit according to claim 9, wherein said upwardly extending arm portion has at least on diagonal slot wherein retaining members are inserted therethrough for securement to said adjustable arm.

11. A motor control unit according to claim 9, wherein said adjustable arm is generally L-shaped.

12. A motor control unit according to claim 8, wherein said laterally extending tab is generally ramp-shaped.

13. A motor control unit according to claim 8, wherein said movable slide member further has a finger tab extending therefrom for disengaging said interlock mechanism.

* * * * *